April 5, 1955     M. J. LEONARD, JR     2,705,662
IRRIGATION HOSE
Filed Sept. 28, 1953
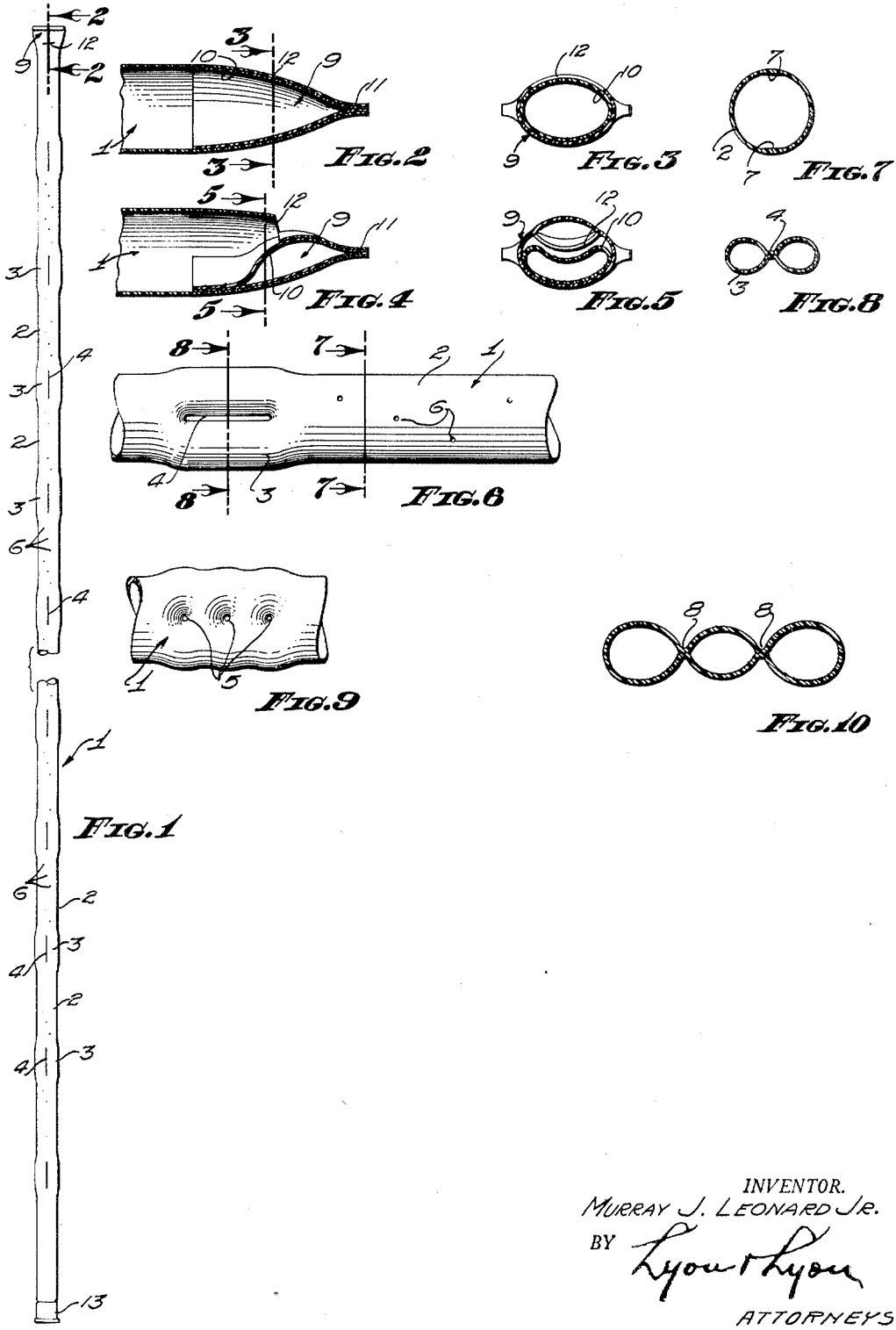
INVENTOR.
MURRAY J. LEONARD JR.
BY Lyon & Lyon
ATTORNEYS

United States Patent Office 2,705,662
Patented Apr. 5, 1955

2,705,662

IRRIGATION HOSE

Murray J. Leonard, Jr., Santa Barbara, Calif.

Application September 28, 1953, Serial No. 382,516

7 Claims. (Cl. 299—104)

My invention relates to irrigation hoses and included in the objects of my invention are:

First, to provide an irrigation hose having a series of spray ports at one side along its length and a plurality of spaced flattened sections so disposed as to restrain the hose against twisting in order that all of the spray ports may be directed upwardly.

Second, to provide an irrigation hose wherein spaced sections are flattened by joining opposite sides of the hose to form two or more passages of restricted area so that the hose comprises alternately single passage sections wherein the water flows at relatively lower velocity and higher pressure, and multiple passage sections wherein the water moves at relatively higher velocity and correspondingly lower pressure, the single passage sections being perforated for lateral discharge of irrigation water.

Third, to provide an irrigation hose which is inherently suited for manufacture from extruded plastic tubing wherein the opposite sides are heat sealed together to form the multiple passage, flattened regions, and wherein a minimum diameter of plastic tubing need be used even through the effective flow area of the hose is reduced in the sections having multiple passages for the reason that these sections need occupy only a small per cent of the total hose length and the attendant loss of pressure head is minimized.

Fourth, to provide an irrigation hose which may be relatively small in diameter for use as a garden spray hose, or large in diameter for agricultural irrigation.

Fifth, to provide an irrigation hose which incorporates a novel and inexpensive valve means at its extremity to permit bleeding of the hose at the close of irrigation or flushing of the hose to remove clogging accumulations.

With the above and other objects in view, as may appear hereinafter, reference is directed to the accompanying drawings:

Figure 1 is a reduced fragmentary plan view of my irrigation hose stretched out in position for use;

Fig. 2 is an enlarged fragmentary sectional view of the extended end of the irrigation hose showing the purging valve in its closed position;

Fig. 3 is a transverse sectional view thereof through 3—3 of Fig. 2;

Fig. 4 is a fragmentary sectional view similar to Fig. 2 showing the purging valve in its open position;

Fig. 5 is a transverse sectional view through 5—5 of Fig. 4 showing the purging valve in its open position;

Fig. 6 is an enlarged fragmentary sectional view of the irrigation hose showing a single passage and a double passage section thereof;

Fig. 7 is a transverse sectional view through 7—7 of Fig. 6;

Fig. 8 is a transverse sectional view through 8—8 of Fig. 6;

Fig. 9 is a fragmentary sectional view showing a modified means of forming the double passage section of the irrigation hose; and Fig. 10 is a transverse sectional view of a modified form of my irrigation hose in which a triple passage section is provided.

My irrigation hose is formed from a length of extruded plastic tubing 1. The plastic selected is preferably of the type which may be heat-sealed to itself. The tubing is divided into single tube sections 2 alternating with double tube sections 3. The double tube sections are formed by flattening the hose and forming a heat-sealed connection 4 between opposite sides. The heat-sealed connection may be in the form of a bar, as shown in Fig. 6, or may comprise one or more "dots" 5, as shown in Fig. 9, or any other suitable pattern.

As shown in Fig. 8, the double tube sections of the irrigation hose are relatively wide as compared to their height so that when the tube is laid out on the ground the double tube sections prevent the irrigation hose from rolling or twisting, consequently, a selected side of the irrigation hose may be directed upwardly. The single tube sections 2 between the double tube sections 3 are provided with a series of spray perforations 6 arranged in any suitable pattern, so that the streams of water may be directed vertically upward or laterally and upwardly, depending upon their locations. In any case, only one side of the hose need be perforated, and due to the fact that the hose is restrained from twisting none of the spray jets need be directed downward into the soil unless the whole hose is deliberately inverted.

The double tube sections in aggregate need occupy only a minor percentage of the entire length of the irrigation hose. As a result the pressure loss due to the restricted flow through the smaller area of the double tube sections does not materially affect the quantity of water which may be discharged from the irrigation hose. Furthermore, it will be observed that the water velocity in the single tube sections is materially slower than the velocity in the double tube sections, consequently, the pressure in the single tube sections is correspondingly greater than in the double tube sections. It therefore follows that discharge through the spray perforations occurs under the most favorable conditions. It also will be observed that, due to the relatively small aggregate length of double tubing and the fact that the spray perforations are located in the regions of relatively high pressure, the diameter of the tubing for a given irrigation capacity may be less than would be the case if the double tubing sections were continuous.

In order to conserve on the amount of plastic material employed in the tubing and still provide sufficient wall thicknesses for purposes of effecting adequate heat-sealed connections, the tubing may be so extruded as to provide diametrically opposed thickened strips 7, as shown in Fig. 7.

While the irrigation hose is ideally suited for garden use and in such use be made approximately one-half to three-quarters of an inch in diameter, it is equally obvious that the irrigation hose may be made several inches in diameter for use in large argricultural irrigation systems, particularly where a high degree of portability is desired. The larger diameter tubing employed for such purpose permits a double sealed connection 8, such as shown in Fig. 10, so that a triple tube section may be formed.

It should be noted that the tubing as extruded is uniform in circumference so that in forming a double tube section the area is materially reduced, and in forming a triple tube section the effective area is still further reduced. Thus while even more than a triple tube section might be employed, a point is reached where the effective area is too small to be efficient.

In the use of a perforated irrigation hose of the type herein disclosed there occurs a continued accumulation of material which tends to clog the spray perforations. It is therefore desirable that the irrigation hose be flushed from time to time and purged of such accumulations. For this purpose a purging valve 9 is provided at the extended end of the irrigation hose. The purging valve includes a short liner tube 10 fitted into the end of the tubing 1. The liner tube 10 and the end of the tubing 1 are flattened and heat-sealed, as indicated by 11.

A slit 12 is formed in the tubing 1 intermediate the ends of the liner tube 10. When the liner tube conforms to the circular or oval configuration of the tubing 1 adjacent its end the slit 12 is closed, as shown in Figs. 2 and 3. When the liner tube 10 is depressed into substantially crescent cross-section, as shown in Figs. 4 and 5, the slit 12 is open to form a discharge port. The purging valve is opened by pressing the end of the tubing 1 and liner tube 10 into crescent form, then releasing the tubing 1 which springs back into oval form opening the slit. To close the purging valve, opposite sides of the tubing 1 are pressed, which causes the liner tube to snap from its crescent position shown in Fig. 5 to its oval position shown in Fig. 3.

The intake end of the irrigation hose is provided with a suitable fitting 13 adapted to be screwed, or otherwise secured, to a pipe or other conduit from which the irrigation water is supplied.

It should be observed that while the spray ports are shown as directed upward to permit use of the device as a sprayer or irrigator, the hose may be inverted so that the spray ports are directed downward to permit its use as a soil soaker. Still further, spray ports may be placed in both the upper and lower sides so that the hose may function simultaneously as a sprayer and soil soaker, if this be desired.

It will also be observed that, while it is preferred to construct the irrigation hose from a heat-sealed extruded plastic, the irrigation hose may be formed from flexible or even rigid material if desired, such as rubber, flexible synthetic resins, or plastics, or semi-rigid or rigid synthetic resins or plastics. Furthermore, the tubing may be formed from sheet stock, rolled and sealed into a tube. And still further, if a heat sealable material is not used suitable cements or plasticizers may be employed to join opposite sides of the tubing to form multiple water course sections.

Having fully described my invention it is to be understood that I do not wish to be limited to the details herein set forth but my invention is of the full scope of the appended claims.

I claim:

1. An irrigation hose, comprising: a length of tubing having a series of spaced flattened areas affording lateral stability tending to prevent torsional displacement of the tubing when said tubing is laying on a surface and filled with a fluid, each of the sections of said tubing between said flattened areas tending to assume a circular cross-section when filled with a fluid and having a pattern of spray perforations along its normally upper side when said tubing is in use.

2. An irrigation hose, comprising: a plurality of single and multiple tube sections connected alternately in series to form a hose structure, the multiple tube sections tending to resist torsional displacement of said hose structure when said hose structure is laying on a surface and filled with a fluid; the single tube sections having a pattern of spray perforations along their upper sides when said hose structure is in use.

3. An irrigation hose, comprising: a length of tubing having a series of spaced flattened areas affording lateral stability tending to prevent torsional displacement of the tubing when said tubing is laying on a surface and filled with a fluid, each of the sections fo said tubing between said flattened areas tending to assume a circular cross-section when filled with a fluid and having a pattern of spray perforations along its normally upper side when said tubing is in use; means for supplying water to one end of said tubing; and a purge valve at the other end of said tubing.

4. An irrigation hose, comprising: a length of tubing having a series of spaced constrictions and spray perforations in the portions of the tubing between said constrictions; means for connecting said tubing to a source of water supply, said perforated portions of tubing between said constrictions establishing regions of relatively low velocity and high pressure as compared to the regions of said constrictions; said constrictions having a cross-sectional configuration tending to resist torsional displacement when said tubing is water-filled and placed on a surface; and a purge valve at the end of said tubing remote from said means.

5. In an irrigation hose, a purge valve comprising: an outer flexible tube closed at its extremity and constituting an end of said irrigation hose, said outer tube having a slit therein; an inner flexible tube fitted within the outer tube and movable between a first position conforming to said outer tube and closing said slit and a second folded position clearing said slit to permit discharge therefrom.

6. A valve means for flexible tubes, comprising: an outer flexible tube of circular cross-section having a slit; an inner tube fitted within the outer tube and arranged to assume a position of circular configuration in conformity with said outer tube to cover said slit and a position of noncircular configuration to uncover said slit.

7. A valve means for flexible tubes, comprising: an outer and an inner flexible tube flattened and sealed together at one end, the outer tube having a slit therein normally closed by said inner tube, said inner tube being distortable into a substantially crescent cross-section to uncover said slit.

References Cited in the file of this patent

UNITED STATES PATENTS

| | | |
|---|---|---|
| 2,566,833 | Healy | Sept. 4, 1951 |
| 2,621,075 | Sedar | Dec. 9, 1952 |